US006856323B2

(12) United States Patent
Moore

(10) Patent No.: US 6,856,323 B2
(45) Date of Patent: Feb. 15, 2005

(54) LAYERED IMAGE RENDERING

(75) Inventor: John S. Moore, Middleton, WI (US)

(73) Assignee: Weather Central, Inc., Madison, WI (US)

( * ) Notice: Subject to any disclaimer, the term of this patent is extended or adjusted under 35 U.S.C. 154(b) by 106 days.

(21) Appl. No.: 09/829,189

(22) Filed: Apr. 9, 2001

(65) Prior Publication Data

US 2002/0145615 A1 Oct. 10, 2002

(51) Int. Cl.$^7$ .............................................. G06T 11/60
(52) U.S. Cl. ...................... 345/629; 345/632; 345/633; 345/634; 345/639; 345/640
(58) Field of Search ........................ 345/629, 630–633, 345/634, 639–641, 619, 422, 426, 581, 606–610

(56) References Cited

U.S. PATENT DOCUMENTS

| | | | | |
|---|---|---|---|---|
| 4,827,253 A | * | 5/1989 | Maltz ........................ | 345/640 |
| 5,638,499 A | * | 6/1997 | O'Connor et al. .......... | 345/630 |
| 5,731,846 A | | 3/1998 | Kreitman et al. | |
| 5,737,031 A | * | 4/1998 | Tzidon et al. .............. | 348/587 |
| 5,790,124 A | | 8/1998 | Fischer et al. | |
| 5,881,321 A | | 3/1999 | Kivolowitz | |
| 5,886,747 A | | 3/1999 | Tzidon et al. | |
| 5,966,134 A | * | 10/1999 | Arias ......................... | 345/589 |
| 6,052,648 A | | 4/2000 | Burfeind et al. | |
| 6,118,427 A | * | 9/2000 | Buxton et al. .............. | 345/629 |
| 6,239,807 B1 | * | 5/2001 | Bossut ....................... | 345/582 |
| 6,317,128 B1 | * | 11/2001 | Harrison et al. ............ | 345/629 |
| 6,369,830 B1 | * | 4/2002 | Brunner et al. ............. | 345/629 |
| 6,377,269 B1 | * | 4/2002 | Kay et al. ................... | 345/589 |
| 6,633,670 B1 | * | 10/2003 | Matthews ................... | 382/176 |

OTHER PUBLICATIONS

Association for Computing Machinery, Thomas Porter & Tom Duff, Compositing Digital Images, Computer Graphics, vol. 18, No. 3, pp. 253–259, Jul. 1984, New York, New York.

Richard. T. Daly, et al., U.S. Appl. No. 09/435,552, entitled Virtual Presentation System and Method, filed Nov. 8, 1999.

* cited by examiner

Primary Examiner—Michael Razavi
Assistant Examiner—Daniel Chung
(74) Attorney, Agent, or Firm—Reinhart Boerner Van Deuren s.c.

(57) ABSTRACT

A method for creating a rendered scene that is composed of two or more RGB image layers that can be composited at a later time. The resulting composition will appear the same as if it were rendered all at the same time. The elements of a foreground image layer scene are rendered separately over a black background and a white background. The RGB components for each pixel of the foreground image layer scene rendered over the black background are combined with the RGB components for each corresponding pixel of the foreground image layer scene rendered over the white background to form a rendered foreground layer. The foreground layer may be combined with a background image layer in a conventional manner, possibly with additional material added between the background and foreground image layers.

8 Claims, 4 Drawing Sheets

LAYERED IMAGE RENDERING

FIELD OF THE INVENTION

This invention pertains generally to computer graphics and image processing and, more particularly, to systems and methods for generating and compositing digital images, such as digital images composed of two or more image layers.

BACKGROUND OF THE INVENTION

Most computer graphics images are computed all at once, so that the rendering program takes care of all computations relating to the overlap and transparency of objects within the image. There are several applications, however, where objects within or layers of an image are rendered separately. In such a case, the compositing techniques used for combining the objects or layers into a single image are relied upon for the anti-aliased accumulation of a full image in which the transparency of foreground layer objects with respect to a background layer is properly represented.

Standard digital RGBA images are defined at the pixel level by four values which define the red, green, and blue color components of the pixel, along with an alpha value which is a mixing factor indicating the amount of coverage or transparency of the pixel when composited with, e.g., overlaid on, a background image. For example, an alpha value for a pixel of zero may indicate no coverage or complete transparency, i.e., the pixel is clear, and thus would not in any way obscure a background layer pixel when composited therewith. An alpha value of one may mean full coverage or a completely opaque pixel, i.e., the pixel would completely cover the corresponding pixel of a background layer composited with the image. Fractional alpha values correspond to partial coverage by or transparency of the pixel when composited with a background layer image.

When compositing computer graphics images of objects or image layers which overlap, standard equations are employed to combine the color elements of corresponding overlapping pixels in appropriate amounts defined by the alpha values of the pixels (e.g., the alpha value of the foreground layer pixel). This conventional color combining procedure works well in many cases. However, for certain foreground layer objects, particularly semi-transparent objects, to be overlaid on a colored background layer, such a compositing procedure employing a formulaic averaging of color contributions made by the foreground layer object and background layer image will not result in the desired composited image if the foreground layer is rendered in a conventional manner. For example, it may be desired to composite a semi-transparent foreground layer object, such as a graphical representation of a white snowflake, over a colored background layer. If the semi-transparent foreground layer object (the snowflake) is rendered in RGBA in a conventional manner, the compositing of the foreground layer object (the snowflake) and background layer in a conventional manner involving an averaging of the color contributions made by the foreground and background layer objects may result in an off-colored object (e.g., a gray snowflake) superimposed on a background layer, rather than the desired semi-transparent object (white snowflake) overlaid on the background layer. (A semi-transparent white snowflake over a colored background would be the resulting image if the entire image, foreground and background layers, were rendered at the same time.) Similar color artifacts can occur at the edges of opaque foreground layer image objects rendered in a conventional manner and overlaid on a background layer image using conventional compositing techniques.

What is desired, therefore, is a relatively simple method of creating a digital image that is composed of two or more image layers and in which the resulting composition will appear the same as if the scene layers were rendered as a single scene all at the same time. Preferably, such a method permits the creation of image layers which can be rendered separately and stored to be composited together at a later time, possibly with additional material added between the rendered image layers.

SUMMARY OF THE INVENTION

The present invention provides a method of creating a rendered scene that is composed of two or more image layers. Background and foreground image layers may be rendered separately, in accordance with the present invention, and saved to be composited at a later time. Additional material may be added between the rendered background and foreground image layers. The image resulting from composition of the image layers rendered in accordance with the present invention will appear as if all of the layers forming the image were rendered simultaneously as a single scene.

All rendering in accordance with the present invention is done in RGBA. Background and foreground image layers to be composited at a later time to form a composited image are rendered separately. The elements of a background image layer may be rendered in a conventional manner in RGBA, and saved for later combination with a foreground image layer. (Alternatively, the background layer may be an RGB only image.)

Creation of a foreground image layer in accordance with the present invention begins with defining a scene of foreground layer image elements or objects. The background of the foreground image layer thus defined is erased to full black. The elements of the foreground image layer scene are then rendered in a conventional manner over the full black background to obtain RGB components for each pixel of the foreground image layer scene rendered over black. The background of the foreground image layer scene is then erased to full white. The elements of the foreground image layer scene are then rendered in a conventional manner over the white background to obtain RGB components for each pixel of the foreground image layer scene rendered over white. The RGB components for each pixel of the foreground image layer scene rendered over black are combined with the RGB components for each corresponding pixel of the foreground image layer scene rendered over white to form the rendered foreground layer image. This rendered foreground layer image may be composited with the saved background image layer, and/or other image layers, in a conventional manner, to form a composited scene which will appear the same as if the scene were rendered all at the same time.

The step of combining the RGB components for each pixel of the foreground image layer scene rendered over black with the RGB components for each corresponding pixel of the foreground image layer scene rendered over white to form the foreground image layer may employ the following procedure in accordance with the present invention to obtain RGBA components for each pixel of the thus rendered foreground layer image. An alpha value for each pixel of the foreground layer image is determined as one plus the value of a color component of the corresponding pixel from the foreground image layer scene rendered over black minus the value of the same color component of the corresponding pixel from the foreground image layer scene rendered over white. For example, an alpha value for each pixel of the foreground layer image to be rendered may be determined as one plus the value of the red component of the corresponding pixel from the foreground image layer scene rendered over black minus the value of the red component of the corresponding pixel of the foreground image layer scene rendered over white. If the resulting alpha value for the pixel of the foreground layer image scene to be rendered equals zero, all of the RGB color component values of the pixel are also set to zero. Otherwise, the RGB color component values of the pixel of the foreground layer image scene being rendered are set to the corresponding color component values of the corresponding pixel from the foreground image layer scene rendered over black divided by the alpha value for the pixel. The resulting RGBA foreground layer image is saved, and may be combined with the RGBA (or RGB) background layer previously rendered, using conventional compositing techniques, to create a composited image scene.

The present invention may thus be employed in combination with conventional RGBA rendering techniques and programs to derive color components and alpha values for an RGBA foreground layer image to be composited with a background layer image. An RGBA foreground layer image rendered in accordance with the present invention may be composited with any background layer scene, and will retain the desired characteristics of the foreground layer image without blending of the colors of the foreground layer scene with the background layer image. Additional image layers, e.g., an image layer positioned between the foreground and background layers, may be composited to form a multi-layer scene. The desirable visual qualities of the foreground image layer rendered in accordance with the present invention are maintained in such a multi-layer composite.

Further objects, features, and advantages of the invention will be apparent from the following detailed description taken in conjunction with the accompanying drawings.

DETAILED DESCRIPTION OF THE INVENTION

Figure 1:
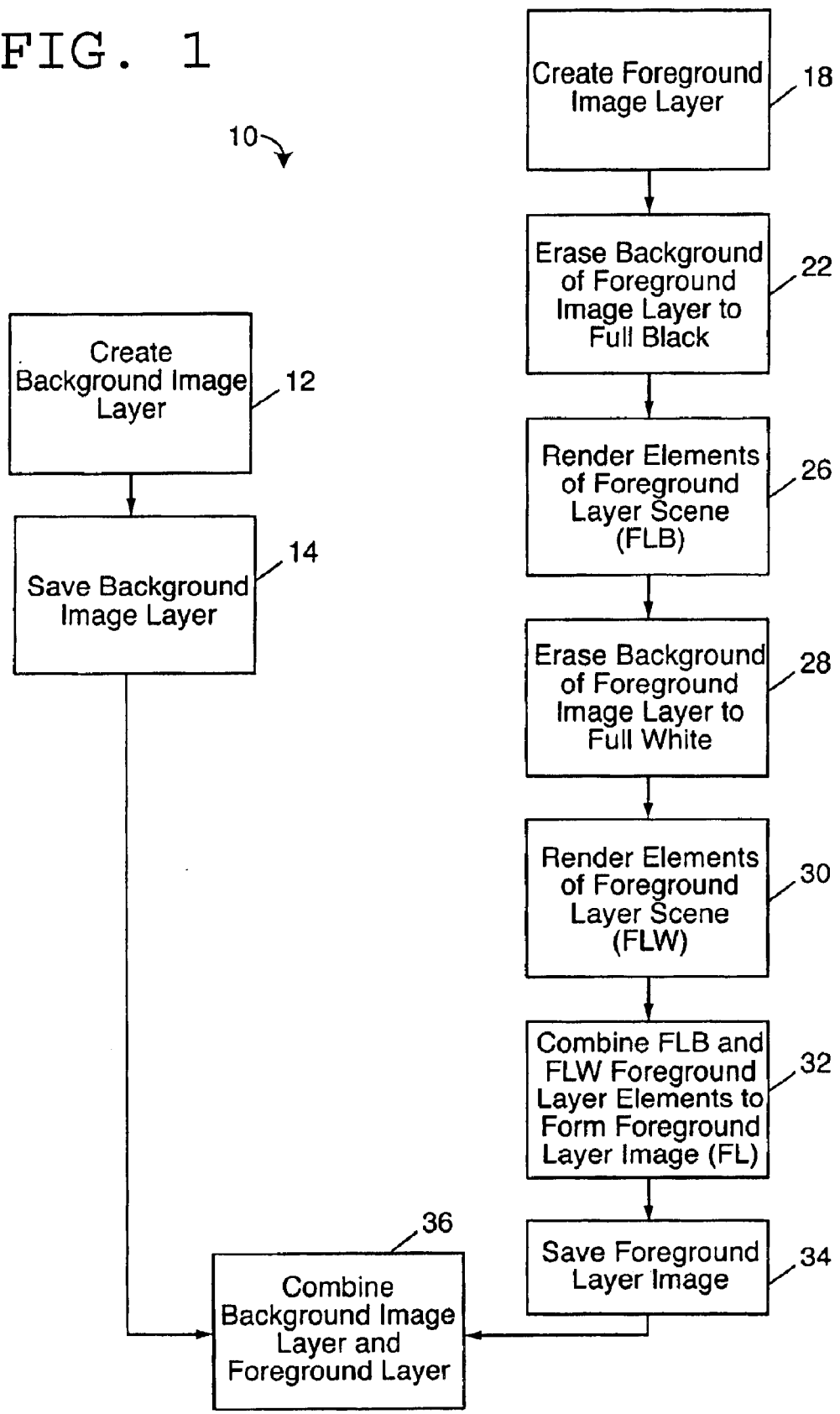
FIG. 1 is a flowchart diagram of an exemplary method for creating a two-layer rendered scene image in accordance with the present invention.

An exemplary method 10 of creating a rendered multi-layer scene image in accordance with the present invention will be described in detail with reference to the flowcart diagram of FIG. 1. The exemplary method 10 to be described in detail herein features the compositing of two RGB image layers, a background image layer and a foreground image layer. Each of the background and foreground image layers are rendered separately, and may be saved and composited at a later time to form a composition which will appear the same as if it were rendered all at the same time. It should be understood that the present invention may be employed very effectively for the creation of rendered scenes that are composed of more than two RGB image layers. For example, the present invention may be employed effectively to render the foreground image layer for a multi-layer virtual presentation incorporating three-dimensional graphics or animations with a live or pre-recorded two-dimensional video image positioned between foreground and background layers of the three-dimensional image. Such a Virtual Presentation System and Method with which the present invention may be employed is described in U.S. Pat. No. 6,335,765, filed Nov. 8, 1999, by Richard T. Daly, et al., which is assigned to the assignee of the present application. Based on the detailed description presented below, a computer programmer of ordinary skill in the art of computer graphics and image processing will be able to implement a layered image rendering method in accordance with the present invention on a conventional computer system.

Figure 2:
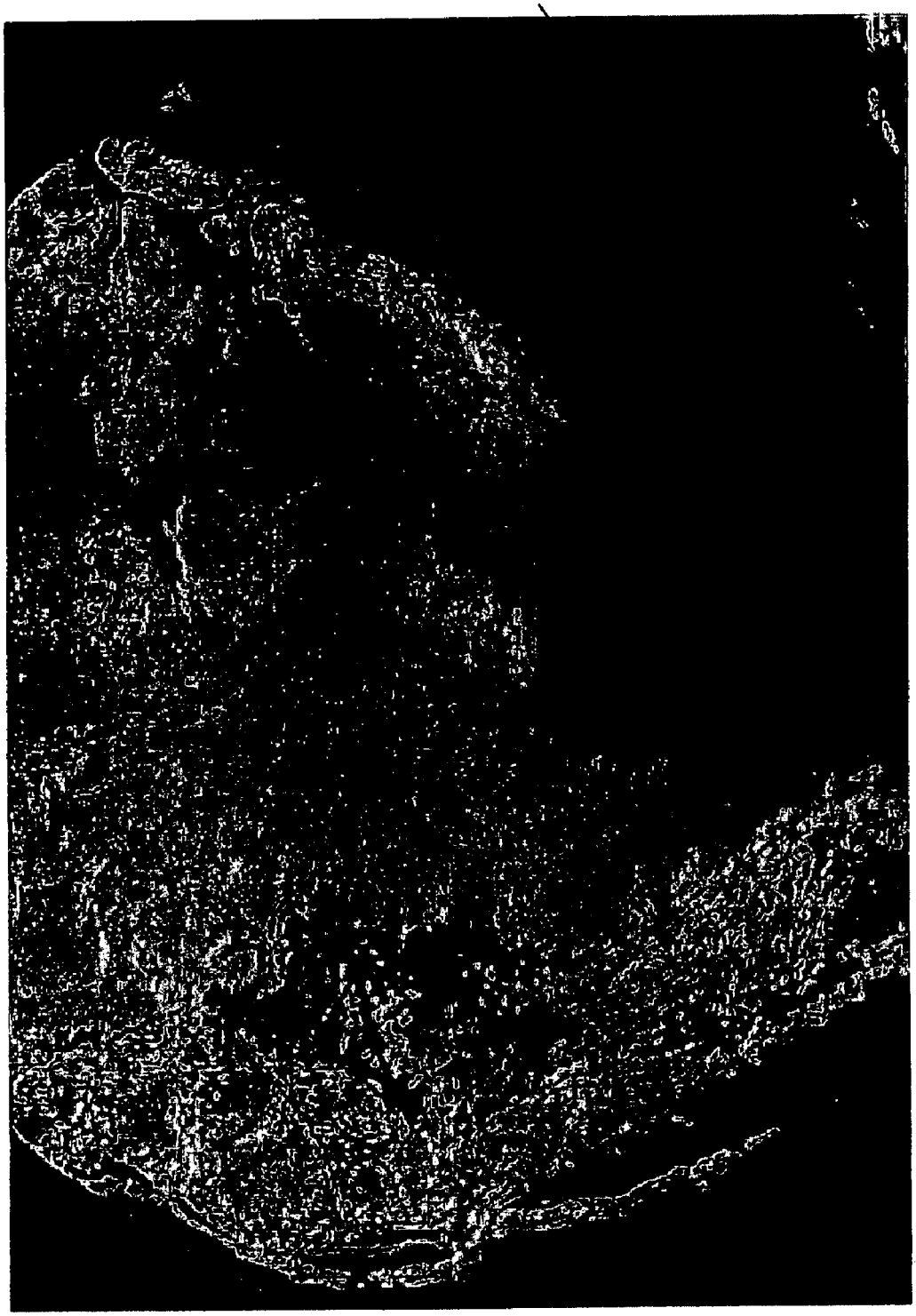
FIG. 2 is an exemplary background image layer scene to be composited with a foreground layer scene rendered in accordance with the present invention.

In accordance with the present invention, background and foreground image layers to be composited are rendered separately in RGBA. An RGBA background image layer is rendered at 12. The background image layer may be rendered in a conventional manner. The background image layer scene may include computer graphics generated images, and/or animated or still digitized photographic images, etc. The RGBA background image layer scene thus rendered is saved at 14, in a conventional manner, to be composited with a foreground image layer scene at a later time. Note that the background layer may be rendered as an RGB image with no alpha. If the background layer is rendered as an RGBA image, the alpha in the background layer may be used during compositing in a conventional manner, e.g., as a holdback mat. An exemplary background image layer scene 16, created in a conventional manner, is illustrated in FIG. 2. The exemplary background image layer scene 16 is a digital satellite image of North America.

Figure 3:
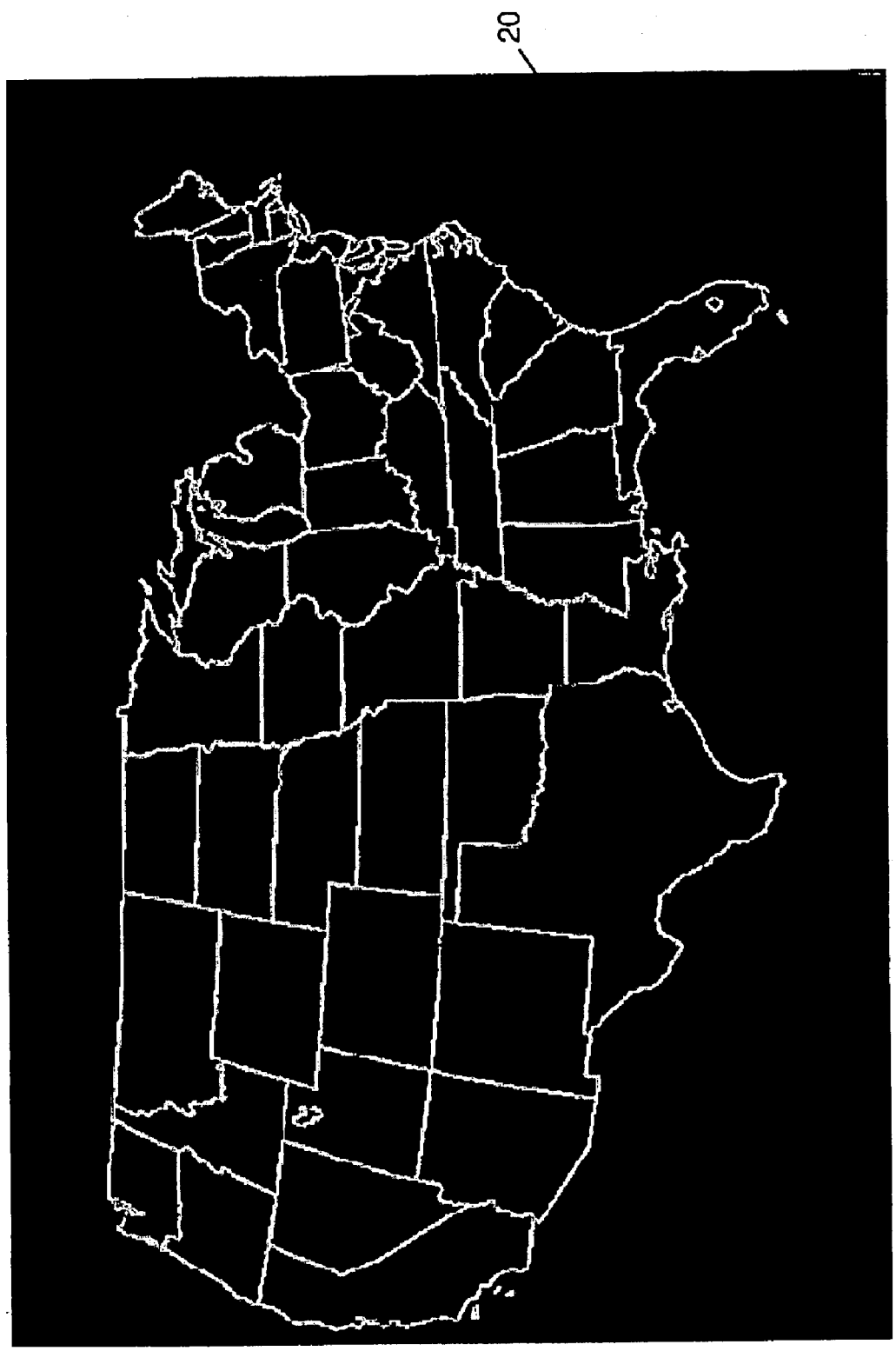
FIG. 3 is an exemplary foreground image layer scene, with the background of the foreground image layer erased to full black, to be composited with the background image layer of FIG. 2.

A foreground image layer is created at 18 by first defining the foreground image layer scene in a conventional manner. The elements, objects, or components appearing in the foreground image layer may be defined and created using any conventional computer graphics generation technique. An exemplary foreground image layer scene 20 is shown in FIG. 3. The exemplary foreground image layer scene 20 is a graphical representation of the state borders of the United States.

The background of the foreground image layer is erased to full black at step 22. In other words, the foreground image layer scene elements are defined over a full black background. (The exemplary foreground image layer elements 20 are shown in FIG. 3 with such a full black background.)

The elements of the foreground image layer scene over the black background are rendered in a conventional manner at step 26 to obtain RGB components for each pixel of the foreground image layer scene rendered over black. We will refer to the resulting RGB image layer scene as FLB (foreground layer rendered over black).

At step 28 the background of the foreground image layer is erased to full white. In other words, the elements of the foreground image layer scene are defined over a full white background.

At step 30 the elements of the foreground image layer scene over the white background are rendered in a conventional manner to obtain RGB components for each pixel of the foreground image layer scene rendered over white. We will refer to this rendered image as FLW (foreground layer rendered over white). (It should be noted that the sequence of steps 22, 26 and 28, 30 may be performed in any order, or simultaneously.)

The RGB components for each pixel of the foreground image layer scene rendered over black (FLB) are then combined with the RGB components for each corresponding pixel of the foreground image layer scene rendered over white (FLW) at 32 to form the rendered foreground image layer (FL). A description of the preferred procedure for forming the foreground image layer (FL) from the foreground layer scene rendered over black (FLB) and the foreground layer scene rendered over white (FLW) follows.

For each corresponding pixel of the foreground image layer rendered over black (FLB) and white (FLW), a new RGBA foreground image layer (FL) pixel is created. The alpha value for each pixel of the new foreground image layer (FL) is determined as one plus the value of a color component (R, G, or B) of the corresponding pixel from the foreground image layer rendered over black (FLB) minus the value of the same color component of the corresponding pixel from the foreground image layer rendered over white (FLW). For example, an alpha value for a pixel of the new foreground layer (FL) may be determined as one plus the value of the red (R) component of the corresponding pixel from the foreground image layer rendered over black (FLB) minus the value of the red (R) component of the corresponding pixel from the foreground image layer rendered over white (FLW).

If the resulting alpha value of the pixel is zero, the value of all of the RGB color components of the pixel are set to zero. Otherwise, the RGB color component values of the pixel of the new foreground layer (FL) are set to the corresponding color component values (R, G, and B) of the corresponding pixel from the foreground image layer scene rendered over black (FLB) divided by the alpha value for the pixel. This procedure is repeated for each pixel of the foreground layer (FL) to be rendered. The resulting foreground layer (FL) is saved at 34, to be combined with the background layer image, or other image layers.

The procedure described above for rendering the foreground layer (FL) may be summarized by the following exemplary equations which are applied to generate each pixel of the foreground layer (FL):

$(FL\ alpha)=1+(FLB\ red\ component)-(FLW\ red\ component)$

If (FL alpha)=0, then (FL red )=0

(FL green)=0

(FL blue)=0

Figure 4:
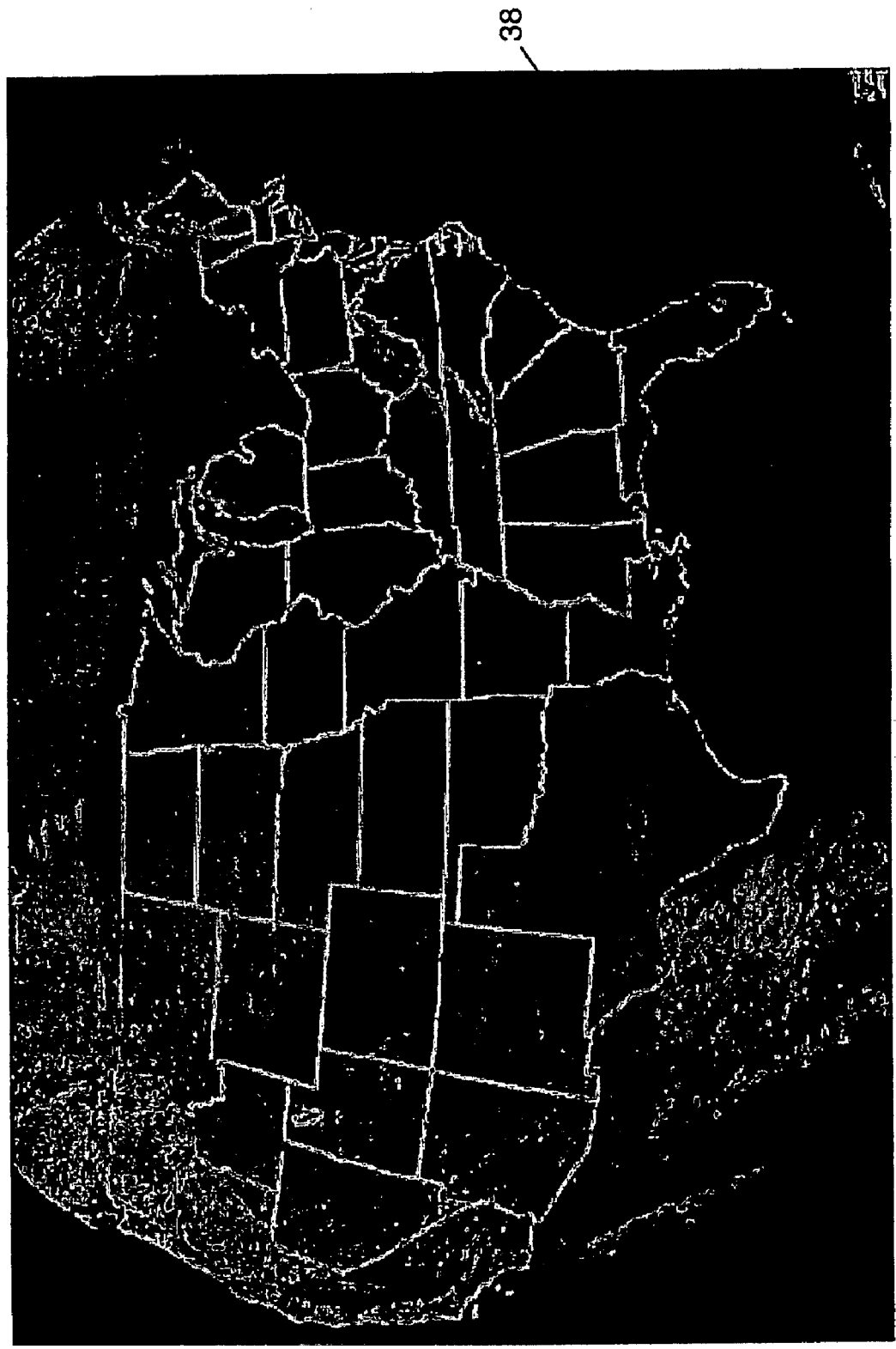
FIG. 4 is an exemplary image scene resulting from the composition of the background image layer of FIG. 2 with the foreground image layer of FIG. 3, rendered in accordance with the present invention.

Else $(FL\ red)=(FLB\ red\ component)/(FL\ alpha)$ $(FL\ green)=(FLB\ green\ component)/(FL\ alpha)$ $(FL\ blue)=(FLB\ blue\ component)/(FL\ alpha)$ Thus, the present invention may be employed in combination with conventional RGBA rendering techniques and programs to derive color components and alpha values for an RGBA foreground layer image to be composited with a background layer image. The resulting rendered foreground layer (FL) may be combined with the saved background layer, using conventional compositing techniques, to form the composition image scene at 36. An exemplary composition 38 of the background image layer 16 of FIG. 2 with the foreground image layer 20 of FIG. 3, rendered in accordance with the present invention, is shown in FIG. 4. The resulting composition appears the same as if the entire image were rendered all at the same time, rather than resulting from the composition of separately rendered background and foreground image layers. A foreground image layer rendered in accordance with the present invention may be combined with any background layer image, or more than one background or intermediate layers, without adversely affecting the quality of the foreground layer as appearing in the composition image.

It should be understood that the present invention is not limited to the exemplary applications and embodiments illustrated and described herein, but embraces such modified forms thereof as come within the scope of the following claims. In particular, it should be understood that a method in accordance with the present invention is not limited to the particular sequence of steps and equations described above.

What is claimed:

1. A method for rendering an image layer scene, comprising the steps of:

(a) defining a scene of image layer elements;

(b) rendering in a computer the elements of the image layer scene over a full black background to obtain color components for each pixel of the image layer scene rendered over full black;

(c) rendering the elements of the image layer scene over a white background to obtain color components for each pixel of the image layer scene rendered over full white; and (d) combining the color components for each pixel of the image layer scene rendered over full black with the color components for each corresponding pixel of the image layer scene rendered over full white to form the rendered image layer scene by, for each corresponding pixel of the image layer scene rendered over full black and full white:

determining an alpha value for the pixel a one plus the value of a single color component of the pixel from the image layer scene rendered over full black minus the value of the same color color component of the corresponding pixel from the image layer scene rendered over full white;

setting all of the color component values of the pixel to zero if the alpha value for the pixel equals zero;

otherwise setting the color component values of the pixel to the corresponding color component values of the corresponding pixel from the image layer scene-rendered over full black divided by, the alpha value for the pixel.

2. The method of claim 1 wherein the step of determining an alpha value for the pixel include the step of determining the alpha value for the pixel as one plus the value of a red component of the pixel from the image layer scene rendered over full black minus the value of the red component of the corresponding pixel from the image layer scene rendered over full white.

3. A method for rendering a multi-layer image, comprising the steps of:

(a) rendering a background image layer;

(b) saving the background image layer;

(c) creating a foreground image layer scene of foreground image layer elements;

(d) rendering in a computer the element of the foreground image layer scene over a full black background to obtain color components for each pixel of the foreground image layer scene rendered over full black;

(e) rendering in a computer the elements of the foreground image layer scene over a full white background to obtain color components for each pixel of the foreground image layer scene rendered over full white;

(f) combining the color components for each pixel of the foreground image layer scene rendered over full black with the color components for each corresponding pixel of the foreground image layer scene rendered over full white to form a rendered foreground image layer by, for each corresponding pixel of the foreground image layer scenes rendered over full black and full white:

determining an alpha value for the pixel as one plus the value of a single color component of the pixel from the foreground image layer scene rendered over full black minus the value of the same color component of the corresponding pixel from the foreground image layer scene rendered over full white;

setting all of the color component values of the pixel to zero if the alpha value for the pixel equals zero;

otherwise setting the color component values of the pixel to the corresponding color component values of the corresponding pixel from the foreground image layer scene rendered over full black divided by the alpha value for the pixel; and (g) compositing the background image layer and the foreground image layer to form a multi-layer image.

4. The method of claim 3 wherein the step of determining an alpha value for the pixel includes the step of determining the alpha value for the pixel as one plus the value of a red component of the pixel from the foreground image layer scene rendered over full black minus the value of the red component of the corresponding pixel from the foreground image layer scene rendered over full white.

5. The method of claim 3 comprising additionally the steps of providing a third image layer and compositing the background image layer, the foreground image layer, and the third image layer to form a multi-layer image with the third image layer appearing between the background and image layer and the foreground image layer in the composited multi-layer image.

6. The method of claim 3 wherein the step of rendering a background image layer includes the step of rendering an RGB background image layer.

7. The method of claim 1 wherein the color components are ROB color components.

8. The method of claim 3 wherein the color components are RGB color components.

* * * * *

UNITED STATES PATENT AND TRADEMARK OFFICE
CERTIFICATE OF CORRECTION

PATENT NO. : 6,856,323 B2
DATED : February 15, 2005
INVENTOR(S) : John S. Moore

It is certified that error appears in the above-identified patent and that said Letters Patent is hereby corrected as shown below:

Column 6,
Line 32, "rendering the elements" should be -- rendering in a computer the elements --.
Line 33, "a white background" should be -- a full white background --.
Line 43, "pixel a one" should be -- pixel as one --.
Line 57, "include" should be -- includes --.

Column 8,
Line 24, "ROB" should be -- RGB --.

Signed and Sealed this

Tenth Day of May, 2005

JON W. DUDAS
*Director of the United States Patent and Trademark Office*